United States Patent
Iiyama et al.

(10) Patent No.: US 11,956,098 B2
(45) Date of Patent: Apr. 9, 2024

(54) COMMUNICATION APPARATUS AND COMMUNICATION METHOD

(71) Applicant: NIPPON TELEGRAPH AND TELEPHONE CORPORATION, Tokyo (JP)

(72) Inventors: Noriko Iiyama, Musashino (JP); Masamichi Fujiwara, Musashino (JP); Hiroo Suzuki, Musashino (JP); Junichi Kani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/007,645

(22) PCT Filed: Jun. 8, 2020

(86) PCT No.: PCT/JP2020/022590
§ 371 (c)(1),
(2) Date: Dec. 1, 2022

(87) PCT Pub. No.: WO2021/250759
PCT Pub. Date: Dec. 16, 2021

(65) Prior Publication Data
US 2023/0246876 A1 Aug. 3, 2023

(51) Int. Cl.
*H04L 12/44* (2006.01)
*H04L 5/00* (2006.01)

(52) U.S. Cl.
CPC ............ *H04L 12/44* (2013.01); *H04L 5/0048* (2013.01)

(58) Field of Classification Search
CPC .............................. H04L 12/44; H04L 5/0048
See application file for complete search history.

(56) References Cited

U.S. PATENT DOCUMENTS

| | | | |
|---|---|---|---|
| 9,935,727 B2* | 4/2018 | Boyd | ............... H04B 10/40 |
| 2011/0150482 A1* | 6/2011 | Furusawa | ......... H04Q 11/0067 |
| | | | 398/79 |

(Continued)

FOREIGN PATENT DOCUMENTS

| | | |
|---|---|---|
| JP | 2015-188155 A | 10/2015 |
| JP | 2017152773 A | 8/2017 |
| JP | 2018-157518 A | 10/2018 |

OTHER PUBLICATIONS

Takamitsu Tochino et al., "FASA: New Access System Architecture", NTT Technical Journal, 2019.4, pp. 13-14, Jun. 6, 2019.

*Primary Examiner* — Jungwon Chang
(74) *Attorney, Agent, or Firm* — Harness, Dickey & Pierce, P.L.C.

(57) ABSTRACT

A communication device includes: a MAC unit that processes a main signal including a payload, and determines a communication timing of the main signal; a communication unit that performs, based on the communication timing, at least one of transmission processing for E/O converting the main signal acquired from the MAC unit, and transmitting the main signal to a communication counterpart device, and reception processing for O/E converting the main signal received from the communication counterpart device; a main signal transmission line through which the main signal is transmitted between the MAC unit and the communication unit; and a control information transmission line that is provided separately from the main signal transmission line, and through which communication timing data that is data indicating the communication timing is transmitted from the MAC unit to the communication unit.

3 Claims, 5 Drawing Sheets

(56) References Cited

U.S. PATENT DOCUMENTS

2014/0248053 A1\* 9/2014 Tamai ................ H04Q 11/0067
398/66
2017/0250777 A1\* 8/2017 Sarashina ......... H04W 56/0015
2021/0321178 A1\* 10/2021 Araya ................ H04J 14/0221

\* cited by examiner

COMMUNICATION APPARATUS AND COMMUNICATION METHOD

CROSS-REFERENCE TO RELATED APPLICATIONS

This application is a 371 U.S. National Phase of International Application No. PCT/JP2020/022590, filed on Jun. 8, 2020. The entire disclosure of the above application is incorporated herein by reference.

TECHNICAL FIELD

The present invention relates to a communication apparatus and a communication method.

BACKGROUND ART

For a Passive Optical Network (PON) optical communication system in which an Optical Line Terminal (OLT) communicates with a plurality of Optical Network Units (ONUs), studies have been carried out to divide the function of the OLT, and freely recombine the divided functions, thereby realizing an optical communication system having various functions (e.g., NPL 1).

For example, the constituent elements of the OLT include an optical transmission/reception unit that performs transmission/reception of signals with the ONUs and converts the signals, and a communication scheduler unit that determines timings of communication with the ONUs. PTL 1 proposes a technique in which the optical transmission/reception unit controls waveform equalization processing or the like of a signal based on a timing determined by the communication scheduler unit in a PON optical communication system that performs Time Division Multiplexing (TDM).

CITATION LIST

Patent Literature

[PTL 1] Japanese Patent Application Publication No. 2017-152773

Non Patent Literature

[NPL 1] Takamitsu Tochino et al., "New Access System Architecture: FASA", NTT Technical Journal, April 2019, pp. 13-14

SUMMARY OF THE INVENTION

Technical Problem

In the case where a communication scheduler unit and an optical transmission/reception unit are configured separately, controlling the optical transmission/reception unit based on a timing determined by the communication scheduler unit requires the optical transmission/reception unit to acquire information regarding the timing. However, in the OLT described in NPL 1, the optical transmission/reception unit cannot acquire information generated by the communication scheduler unit.

An object of the present invention is to provide a communication apparatus in which, even in the case where an optical transmission/reception unit and a communication scheduler unit are configured by separate pieces of hardware or software, the optical transmission/reception unit can transmit/receive a signal based on information of a timing determined by the communication scheduler unit.

Means for Solving the Problem

An aspect of the present invention is directed to a communication apparatus including: a MAC unit that processes a main signal including a payload, and determines a communication timing of the main signal; a communication unit that performs at least one of transmission processing for changing, when E/O converting the main signal and transmitting the main signal a communication counterpart device, a transmission condition based on the communication timing acquired from the MAC unit, and reception processing for changing, when O/E converting the main signal received from the communication counterpart device, a reception condition based on the communication timing acquired from the MAC unit; a main signal transmission line through which the main signal is transmitted between the MAC unit and the communication unit; and a control information transmission line that is provided separately from the main signal transmission line, and through which communication timing data that is data indicating the communication timing is transmitted from the MAC unit to the communication unit.

An aspect of the present invention is directed to a communication method including: a communication scheduling step of, by a MAC unit, processing a main signal including a payload, and determining a communication timing of the main signal; a main signal transmission step of, by the MAC unit and a communication unit, transmitting the main signal via main signal transmission line; a control information transmission step of transmitting, from the MAC unit, communication timing data that is data of the communication timing to the communication unit via a control signal transmission line that is provided separately from the main signal transmission line; and a communication step of, by the communication unit, performing, based on the communication timing, at least one of transmission processing for E/O converting the main signal acquired from the MAC unit and transmitting the main signal to a communication counterpart device, and reception processing for O/E converting the main signal received from the communication counterpart device.

Effects of the Invention

According to the present invention, even in the case where a transmission/reception unit and a communication scheduler unit are configured by separate pieces of hardware or software, the transmission/reception unit can transmit/receive a signal based on information of a timing determined by the communication scheduler unit.

DESCRIPTION OF EMBODIMENTS

First Embodiment

Hereinafter, an embodiment of the present invention will be described in detail with reference to the drawings.
<<Configuration of Communication Device>>

Figure 1:
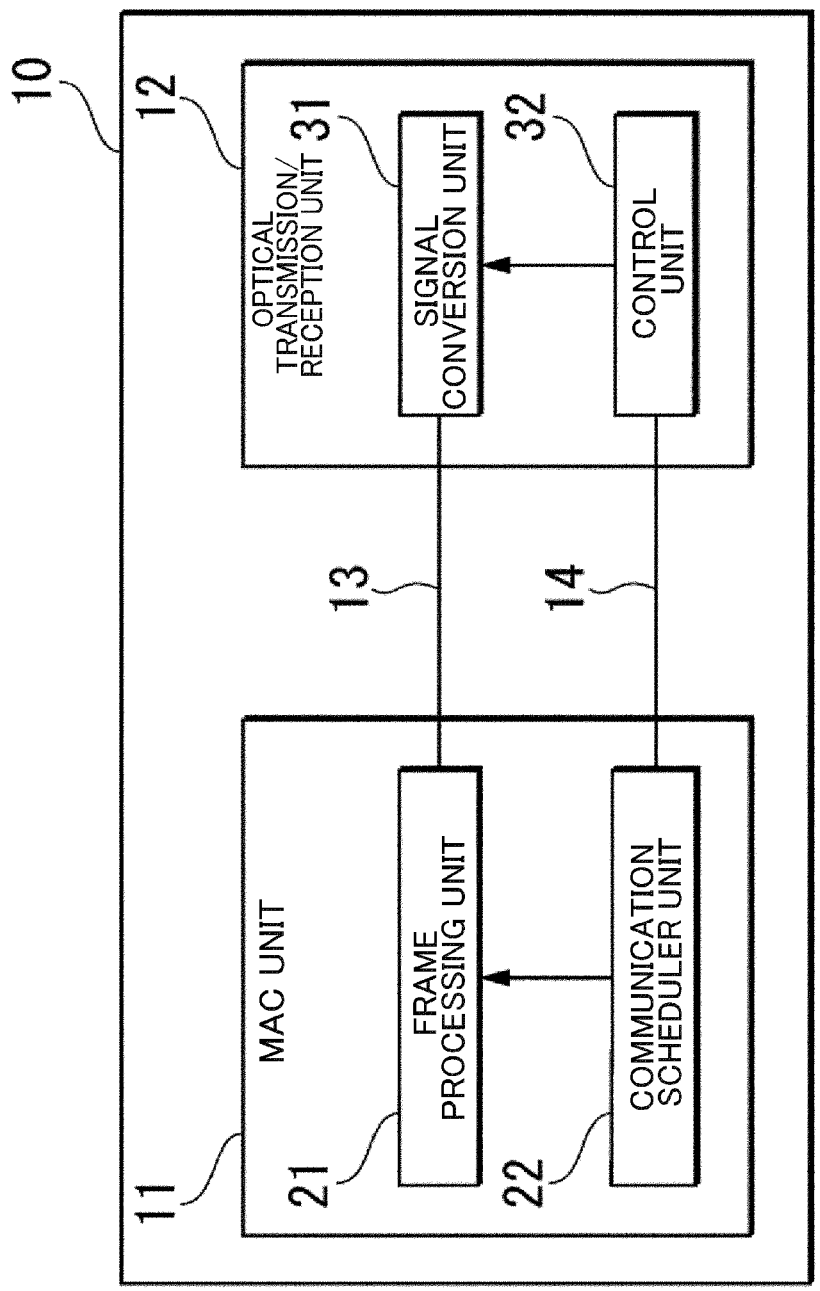
FIG. 1 is a diagram showing a configuration of a communication device according to a first embodiment

FIG. 1 is a diagram showing a configuration of a communication device (apparatus) 10 according to a first embodiment. The communication device 10 is a communication device that functions as an OLT in a PON optical communication system.

The communication device 10 includes a MAC unit 11, an optical transmission/reception unit 12, a main signal transmission line 13, and a control information transmission line 14.

The MAC unit 11 performs frame processing on a signals. The MAC unit 11 is configured as a component that can be interchanged depending on the use such as FTTH (Fiber to the home) or mobile use. That is, the communication device 10 includes any of a plurality of types of MAC units 11 such as a MAC unit for FTTH use and a MAC unit for mobile use that is suitable for the purpose of the communication device 10. The MAC unit 11 includes a frame processing unit 21 and a communication scheduler unit 22. The frame processing unit 21 performs frame processing. In order to include transmission destination information in a signal to be transmitted, the frame processing unit 21 generates a main signal from data to be transmitted and scheduling data determined by the communication scheduler unit 22, and outputs the main signal to the optical transmission/reception unit. That is, the main signal is a frame including data to be transmitted and scheduling data. The scheduling data is determined using a Dynamic Bandwidth Allocation (DBA) algorithm or the like. The scheduling data is data regarding communication scheduling such as the ONU that performs communication and the timing of performing that communication, and includes information indicating the allocated time domain. In addition, the frame processing unit 21 extracts, from the main signal acquired from the optical transmission/reception unit 12, the data about the ONU that is the transmission source and the data transmitted by the ONU. This frame processing corresponds to MAC frame processing in IEEE 802.3. The communication scheduler unit 22 determines the scheduling data using a DBA algorithm or the like.

The optical transmission/reception unit 12 is a communication interface that performs transmission/reception of a main signal with each of the ONUs. The optical transmission/reception unit 12 is configured as a component that can be interchanged depending on the usage. Examples of the types of the optical transmission/reception unit 12 include an optical wavelength multiplexing communication transceiver, a direct modulation optical transmitter, and a direct detection optical receiver. That is, the communication device 10 includes any of a plurality of types of optical transmission/reception units 12 that is suitable for the purpose of the communication device 10. The optical transmission/reception unit 12 includes a signal conversion unit 31 and a control unit 32. The signal conversion unit 31 converts a main signal that is transmitted/received. For example, the signal conversion unit 31 converts (O/E converts) an optical signal received by the signal conversion unit 31 into an electric signal, and further converts the electric signal from an analog signal into a digital signal. The digital signal is output to the MAC unit 11, and subjected to frame processing. In addition, the signal conversion unit 31 converts the electric signal input from the MAC unit from a digital signal into an analog signal, and further converts (E/O converts) the electric signal converted into the analog signal into an optical signal. The optical signal is transmitted to the outside. The control unit 32 controls the signal conversion unit 31 based on data about the ONU that performs communication and the timing at which the communication is performed.

The main signal transmission line 13 and the control information transmission line 14 are interfaces for the MAC unit 11 and the optical transmission/reception unit 12 to communicate with each other.

The transmission speed of the control information transmission line 14 may be lower than the transmission speed of the main signal transmission line 13.
<<Input-Output Relationship of Communication Device>>

The frame processing unit 21 and the signal conversion unit 31 transmit and receive a main signal to and from each other via the main signal transmission line 13. The communication scheduler unit 22 outputs scheduling data to the control unit 32 via the control information transmission line 14. That is, the MAC unit 11 transmits a main signal via the main signal transmission line 13, while transmitting scheduling data via the control information transmission line 14 in parallel therewith. The signal conversion unit 31 and the ONU transmit and receive a main signal to and from each other.
<<Operation of Communication Device>>

Figure 2:
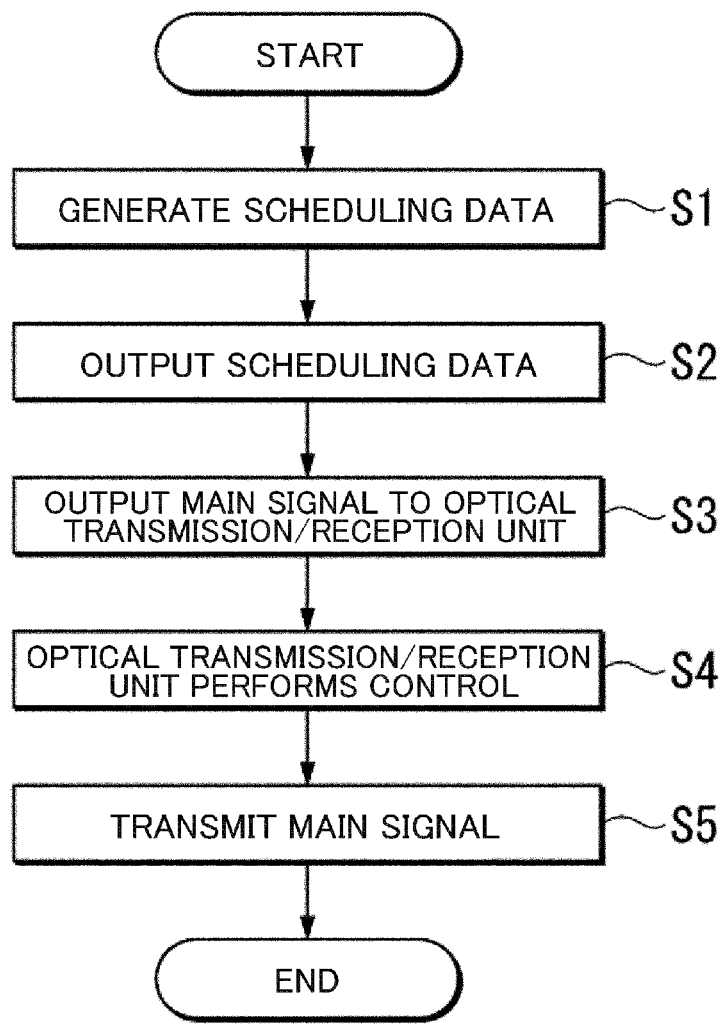
FIG. 2 is a flowchart illustrating a transmission operation of the communication device according to the first embodiment.

FIG. 2 is a flowchart illustrating an example of a transmission operation of the communication device 10 according to the first embodiment. The flowchart shown in FIG. 2 illustrates an operation performed when the communication device that functions as the OLT transmits a signal to an ONU.

First, the communication scheduler unit 22 of the MAC unit 11 determines scheduling data, and generates data thereof (step S1). The communication scheduler unit 22 outputs the data generated in step S1 to the optical transmission/reception unit 12 via the control information transmission line 14 (step S2). The data that is output by the communication scheduler unit 22 is unframed data. That is, the communication scheduler unit 22 transmits the scheduling data in a format that is different from a frame. Thereafter, the frame processing unit 21 performs frame processing on a main signal, and outputs the main signal to the optical transmission/reception unit 12 (step S3). The optical transmission/reception unit 12 can predict, from the scheduling data, the ONU that is the transmission destination and the timing of transmission. The control unit 32 controls a main signal transmission operation of the signal conversion unit 31 based on the acquired scheduling data (step S4). For example, the optical transmission/reception unit 12 can perform control such as alteration of the type of a waveform equalization filter, alteration of the tap coefficient of the waveform equalization filter, alteration of the transmission power, and alteration of the modulation method, thereby varying the characteristics of the signal to be transmit, depending on each of the ONUs. In other embodiments, the control method used by the optical transmission/reception unit 12 is not limited thereto. The signal conversion unit 31 converts the main signal into an analog signal and then into an optical signal under control of the control unit 32, and transmits the converted signal to the ONU (step S5).

Figure 3:
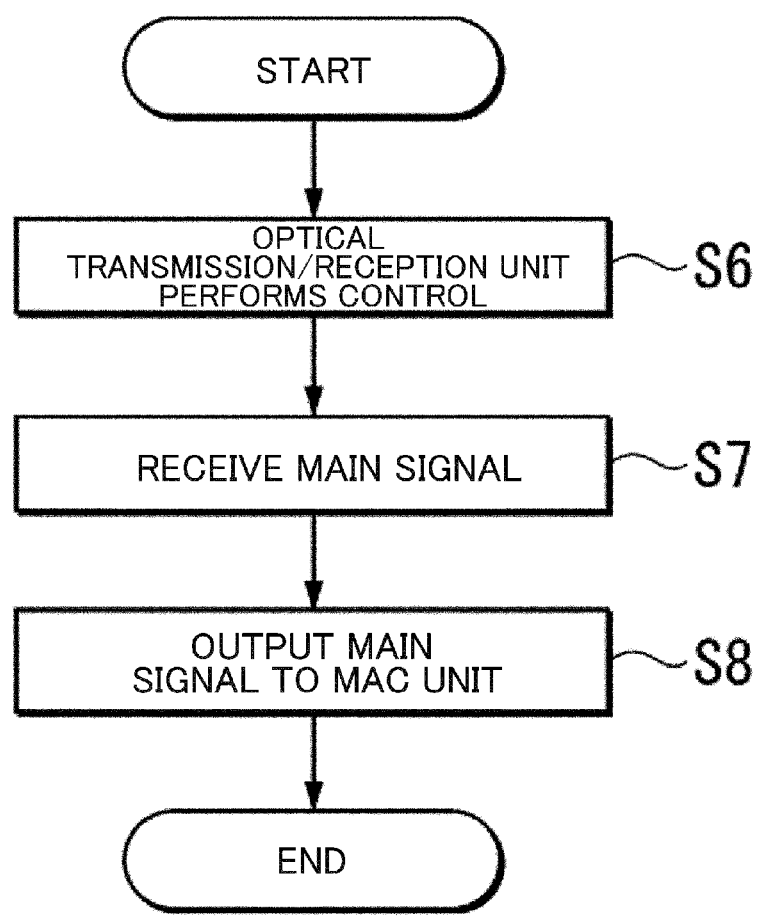
FIG. 3 is a flowchart illustrating a reception operation of the communication device according to the first embodiment.

FIG. 3 is a flowchart illustrating a reception operation of the communication device 10 according to the first embodiment. The flowchart shown in FIG. 3 illustrates an operation performed when the communication device 10 is used as an OLT in a PON system, and the communication device that functions as the OLT receives a signal from an ONU.

The control unit 32 predicts, from the scheduling data acquired in step S2, the ONU that is the transmission source and the timing of reception. The control unit 32 controls a main signal reception operation of the signal conversion unit 31 based on the predicted reception timing (step S6). For example, the control unit 32 performs, based on the predicted reception timing, control such as alteration of the type of the waveform equalization filter of the optical transmission/reception unit 12, alternation of the tap coefficient of the waveform equalization filter, alteration of the reception power, and alteration of the reception modulation method, thereby varying the reception condition depending on each of the ONUs. The signal conversion unit 31 receives the main signal from the ONU under control of the control unit 32 (step S7). Thereafter, the signal conversion unit 31 O/E converts the main signal received from the ONU, and outputs the main signal to the MAC unit 11 (step S8). The frame processing unit 21 performs frame processing on the acquired signal.

<<Operation and Effects>>

Thus, according to the first embodiment, the MAC unit generates scheduling data, and outputs the data to the optical transmission/reception unit via the control information transmission line. The optical transmission/reception unit acquires the scheduling data, and controls, based on the data, the signal processing method or the like used when performing transmission/reception. This makes it possible to vary the signal processing method or the like depending on the ONU with which the optical transmission/reception unit communicates. Accordingly, communication that meets the condition of each of the ONUs can be performed even in an OLT whose function is divided into components.

COMPARATIVE EXAMPLE

In the following, the effects of the first embodiment will be described in comparison with a communication device 10 according to a comparative example.

Figure 4:
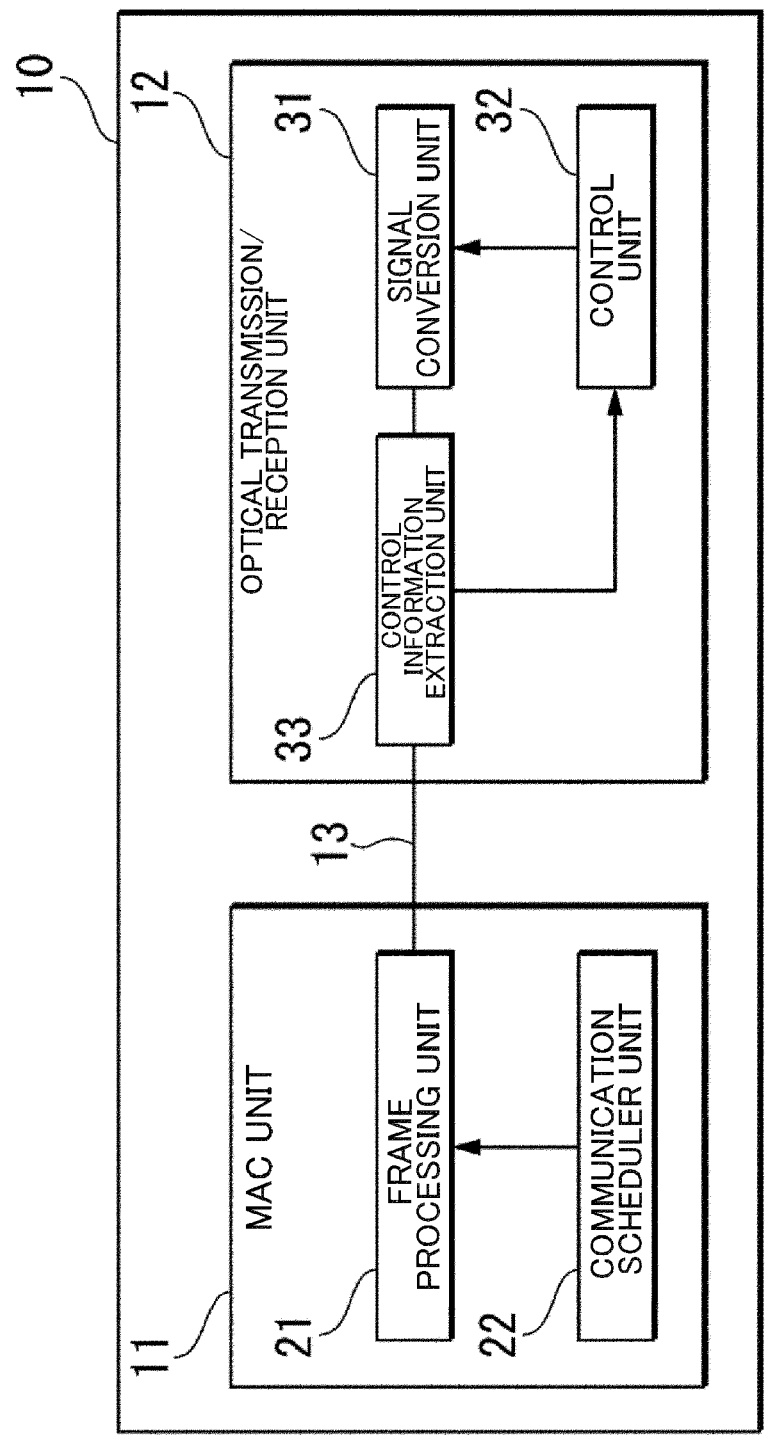
FIG. 4 is a diagram showing a configuration of a communication device according to a comparative example.

FIG. 4 is a diagram showing a configuration of the communication device 10 according to the comparative example.

In the communication device 10 according to the comparative example, the optical transmission/reception unit 12 further includes a control information extraction unit 33, in addition to the components of the first embodiment. However, unlike the first embodiment, the communication device 10 according to the comparative example does not include the control information transmission line 14.

The control information extraction unit 33 extracts scheduling data from a main signal that has been subjected to frame processing. Via the main signal transmission line 13, the frame processing unit 21 and the control information extraction unit 33 transmit and receive a main signal to and from each other.

That is, as in the communication device described in NPL 1, the communication device 10 according to the comparative example does not have a configuration in which the communication scheduler unit and the optical transmission/ reception unit directly perform data transmission, and the optical transmission/reception unit acquires scheduling data by extracting the scheduling data from a main signal.

<<Operation of Communication Device>>

Figure 5:
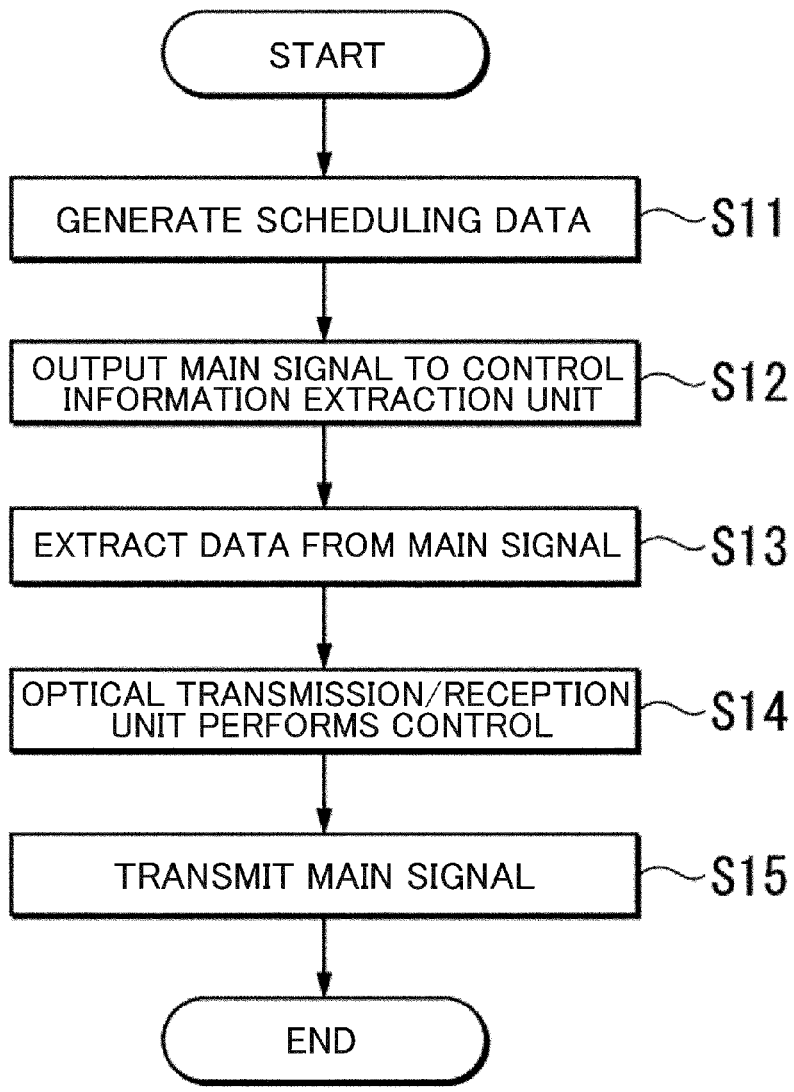
FIG. 5 is a flowchart illustrating an example of an operation of the communication device according to the comparative example.

FIG. 5 is a flowchart illustrating an example of an operation of the communication device 10 according to the comparative example. The flowchart shown in FIG. 5 illustrates an operation when an OLT is used as the communication device 10 in a PON system, and the communication device that functions as the OLT transmits a signal to an ONU.

First, the communication scheduler unit 22 of the MAC unit 11 determines scheduling data, and generates data thereof (step S11). The frame processing unit 21 performs frame processing on a main signal, and outputs the main signal to the control information extraction unit 33 (step S12). The control information extraction unit 33 extracts the scheduling data from the acquired main signal (step S13). Based on the scheduling data extracted by the control information extraction unit 33, the control unit 32 controls the operation of the signal conversion unit 31 when transmitting the main signal (step S14). The signal conversion unit 31 converts the main signal under control of the control unit 32, and transmits the main signal to the ONU (step S15).

When the communication device 10 according to the comparative example receives a signal from the ONU, the control unit 32 predicts, from the scheduling data extracted in step S13, the ONU that is the transmission source and the timing of reception. Based on the predicted reception timing, the control unit 32 controls a main signal reception operation of the signal conversion unit 31. Then, the signal conversion unit 31 receives the main signal from the ONU under control of the control unit 32.

As described above, the communication device 10 according to the first embodiment and the communication device 10 described as the comparative example differ from each other with regard to the method by which the optical transmission/reception unit 12 acquires the scheduling data. In the comparative example, the control information extraction unit 33 extracts the scheduling data from the main signal, and therefore needs to operate at a bit rate at which the main signal is transmitted/received. In the control unit 32 as well, the operation of acquiring the scheduling data needs to be performed at a bit rate comparable to the bit rate at which the control information extraction unit 33 operates. That is, the optical transmission/reception unit 12 according to the comparative example includes the control information extraction unit 33 and the control unit 32 that operate at high speed, and therefore requires higher complexity and higher cost, and has higher power consumption and a larger size, as compared with the optical transmission/reception unit 12 according to the first embodiment.

On the other hand, in the first embodiment, the control information transmission line 14 is provided, and the scheduling data is transmitted from the MAC unit 11 to the optical transmission/reception unit 12 via the control information transmission line 14. Since the data amount of the scheduling data is smaller than that of the main signal, the control information transmission line 14 need not operate at a higher speed than the main signal transmission line 13. The operation in which the control unit 32 acquires the scheduling data may be performed at a speed comparable to the transmission speed of the control information transmission line 14, and this operation can be realized by a circuit at a speed lower than the bit rate at which the main signal is transmitted/ received. Accordingly, the communication device according to the first embodiment can have a simpler configuration as compared with the communication device according to the comparative example.

OTHER EMBODIMENTS

While an embodiment of the present invention has been described in detail above with reference to the drawings, specific components thereof are not limited to those described above, and various design modifications and the like can be made without departing from the gist of the invention.

For example, the communication device 10 is used as an OLT in a PON optical communication system in the above-described embodiment. However, the present invention is not limited thereto.

The MAC unit 11 and the optical transmission/reception unit 12 need not be located in the same casing, as long as the MAC unit 11 and the optical transmission/reception unit 12 are in a state in which they can communicate with each other.

The MAC unit and the optical transmission/reception unit of the communication device each include a CPU (Central Processing Unit), a memory, an auxiliary storage device, and the like that are connected to each other via a bus, and the MAC unit and the optical transmission/reception unit, by executing programs, respectively function as the MAC unit including the frame processing unit 21 and the communication scheduler unit 22, and the optical transmission/reception unit including the control unit 32. All or part of the functions of the communication device may be implemented using hardware such as an ASIC (Application Specific Integrated Circuit), a PLD (Programmable Logic Device), and an FPGA (Field Programmable Gate Array). The program may be recorded in a computer-readable recording medium. The computer-readable recording medium is, for example, a portable medium such as a flexible disk, a magneto-optical disk, a ROM, and a CD-ROM, or a storage device that is built in a computer system, such as a hard disk. The programs may be transmitted via an electric communication line.

REFERENCE SIGNS LIST

10 Communication device
11 MAC unit
12 Optical transmission/reception unit
13 Main signal transmission line
14 Control information transmission line
21 Frame processing unit
22 Communication scheduler unit
31 Signal conversion unit
32 Control unit
33 Control information extraction unit

The invention claimed is:

1. A communication apparatus comprising:
a MAC (Media Access Control) unit that is configured as a component that can be interchanged and that processes a main signal including a payload, and determines a communication timing of the main signal;
a communication unit that is a communication interface configured as a component that can be interchanged, and that performs at least one of transmission processing for changing, when Electrical-to-Optical (E/O) converting the main signal and transmitting the main signal to a communication counterpart device, a transmission condition based on the communication timing acquired from the MAC (Media Access Control) unit, and reception processing for changing, when O/E converting the main signal received from the communication counterpart device, a reception condition based on the communication timing acquired from the MAC (Media Access Control) unit;
a main signal transmission line that is an interface through which the main signal is transmitted between the MAC (Media Access Control) unit and the communication unit; and
a control information transmission line that is an interface that is provided separately from the main signal transmission line, and through which communication timing data that is data indicating the communication timing is transmitted from the MAC (Media Access Control) unit to the communication unit, wherein the MAC unit transmits the communication timing data in a format that is different from the frame to the communication unit via the control information transmission line.

2. A communication apparatus comprising:
a MAC (Media Access Control) unit that is configured as a component that processes a main signal including a payload, and determines a communication timing of the main signal;
a communication unit that is a component that performs at least one of transmission processing for changing, when Electrical-to-Optical (E/O) converting the main signal and transmitting the main signal to a communication counterpart device, a transmission condition based on the communication timing acquired from the MAC (Media Access Control) unit, and reception processing for changing, when O/E converting the main signal received from the communication counterpart device, a reception condition based on the communication timing acquired from the MAC (Media Access Control) unit;
a main signal transmission line that is a interface through which the main signal is transmitted between the MAC (Media Access Control) unit and the communication unit; and
a control information transmission line that is a interface that is provided separately from the main signal transmission line, and through which communication timing data that is data indicating the communication timing is transmitted from the MAC (Media Access Control) unit to the communication unit,
wherein the MAC (Media Access Control) unit
converts the main signal into a frame, transmits the frame to the communication unit via the main signal transmission line, and
transmits the communication timing data in a format that is different from the frame to the communication unit via the control information transmission line.

3. A communication method comprising:
a communication scheduling step of, by a MAC (Media Access Control) unit, processing a main signal including a payload, and determining a communication timing of the main signal;
a main signal transmission step of, by the MAC (Media Access Control) unit and a communication unit, transmitting the main signal via main signal transmission line;
a control information transmission step of transmitting, from the MAC (Media Access Control) unit, communication timing data that is data of the communication timing to the communication unit via a control signal transmission line that is provided separately from the main signal transmission line; and a communication step of, by the communication unit, performing, based on the communication timing, at least one of transmission processing for Electrical-to-Optical(E/O) converting the main signal acquired from the MAC (Media Access Control) unit and transmitting the main signal to a communication counterpart device, and reception processing for O/E converting the main signal received from the communication counterpart device, wherein the MAC unit is configured as a component that can be interchanged and the communication unit is configured as a component that can be interchanged, and the MAC unit transmits the communication timing data in a format that is different from the frame to the communication unit via a control information transmission line.

* * * * *